US008989740B2

(12) United States Patent
Economy et al.

(10) Patent No.: US 8,989,740 B2
(45) Date of Patent: Mar. 24, 2015

(54) METHOD AND APPARATUS FOR SELECTING ONE OF A PLURALITY OF NETWORKS FOR AN APPLICATION SERVICE BASED UPON PERFORMANCE METRICS FOR THE APPLICATION SERVICE

(75) Inventors: George R. Economy, Arlington Heights, IL (US); Daniel J. McDonald, Cary, IL (US)

(73) Assignee: Motorola Solutions, Inc., Schaumburg, IL (US)

(*) Notice: Subject to any disclaimer, the term of this patent is extended or adjusted under 35 U.S.C. 154(b) by 330 days.

(21) Appl. No.: 13/329,247

(22) Filed: Dec. 17, 2011

(65) Prior Publication Data

US 2013/0157708 A1 Jun. 20, 2013

(51) Int. Cl.
*H04W 36/00* (2009.01)
*H04W 72/00* (2009.01)

(52) U.S. Cl.
USPC ........ 455/436; 455/439; 455/442; 455/452.1; 455/453

(58) Field of Classification Search
CPC ........................... H04W 48/18; H04M 15/8016
USPC .................................. 455/518, 519
See application file for complete search history.

(56) References Cited

U.S. PATENT DOCUMENTS

| | | | | |
|---|---|---|---|---|
| 6,731,625 | B1* | 5/2004 | Eastep et al. ................. | 370/352 |
| 7,433,929 | B2 | 10/2008 | Guilford et al. | |
| 8,059,557 | B1* | 11/2011 | Sigg et al. ..................... | 370/252 |
| 8,588,807 | B2* | 11/2013 | Kumar ......................... | 455/456.1 |
| 2001/0009853 | A1 | 7/2001 | Arimitsu | |
| 2004/0198360 | A1* | 10/2004 | Kotzin ........................... | 455/445 |
| 2006/0072583 | A1* | 4/2006 | Sanda et al. .............. | 370/395.53 |
| 2006/0268711 | A1 | 11/2006 | Doradla et al. | |
| 2008/0102815 | A1* | 5/2008 | Sengupta et al. ............. | 455/424 |
| 2009/0005102 | A1* | 1/2009 | Das et al. ...................... | 455/522 |
| 2010/0048205 | A1 | 2/2010 | Guilford et al. | |
| 2010/0083121 | A1 | 4/2010 | Famolari et al. | |
| 2010/0145161 | A1 | 6/2010 | Niyato et al. | |
| 2010/0178919 | A1 | 7/2010 | Deepak et al. | |
| 2010/0279622 | A1 | 11/2010 | Shuman et al. | |
| 2010/0330943 | A1* | 12/2010 | Hoepfner ..................... | 455/226.2 |
| 2011/0116479 | A1* | 5/2011 | Jarzra et al. .................. | 370/332 |
| 2011/0117907 | A1 | 5/2011 | Hooli et al. | |
| 2011/0269476 | A1* | 11/2011 | Kumar ......................... | 455/456.1 |

(Continued)

FOREIGN PATENT DOCUMENTS

| | | | |
|---|---|---|---|
| EP | 1662836 | A2 | 5/2006 |
| EP | 1527560 | B1 | 8/2007 |
| EP | 1826953 | A1 | 8/2007 |

(Continued)

OTHER PUBLICATIONS

PCT International Search Report Dated Apr. 2, 2013 for Counterpart Application PCT/US2012/069068.

*Primary Examiner* — Tilahun B Gesesse
(74) *Attorney, Agent, or Firm* — Steven A. May

(57) ABSTRACT

A communication device performs a method for selecting a network for an application service based upon system performance. The method includes obtaining multiple sets of performance metrics. Each of the multiple sets of performance metrics comprises at least one performance metric for a same application service. The method further includes evaluating the multiple sets of performance metrics to select one of the corresponding networks to access the application service on the selected network.

16 Claims, 5 Drawing Sheets

(56) References Cited

U.S. PATENT DOCUMENTS

| | | | |
|---|---|---|---|
| 2011/0300865 A1* | 12/2011 | Kashikar et al. | 455/435.2 |
| 2012/0052873 A1* | 3/2012 | Wong | 455/456.1 |
| 2012/0218883 A1* | 8/2012 | Xu et al. | 370/225 |
| 2012/0329449 A1* | 12/2012 | Das et al. | 455/423 |
| 2013/0157708 A1* | 6/2013 | Economy et al. | 455/518 |

FOREIGN PATENT DOCUMENTS

| | | |
|---|---|---|
| WO | 2005084362 A2 | 9/2005 |
| WO | 2009156554 A1 | 12/2009 |

\* cited by examiner

METHOD AND APPARATUS FOR SELECTING ONE OF A PLURALITY OF NETWORKS FOR AN APPLICATION SERVICE BASED UPON PERFORMANCE METRICS FOR THE APPLICATION SERVICE

FIELD OF THE DISCLOSURE

The present disclosure relates generally to accessing application services across multiple networks and, in particular, to a method and apparatus for selecting one of multiple networks for accessing an application service based upon performance metrics for the application service.

BACKGROUND

As mobile technologies have evolved rapidly in recent years, numerous types of wireless networks (also referred to herein simply as networks or systems) using different access technologies are available for mobile telecommunication. Such networks include, but are not limited to: Land Mobile Radio (LMR) networks (such as Project 25 (P25) and Terrestrial Trunked Radio (TETRA) networks); $3^{rd}$ Generation (3G) wireless networks (such as CDMA2000 and Universal Mobile Telecommunications System (UMTS) networks); $4^{th}$ Generation (4G) or pre-4G wireless networks (such as Long Term Evolution (LTE) and WiMAX networks); and satellite networks. Moreover, wireless networks are currently deployed for public or private use. For example, a private 4G network may be deployed for a public safety agency, and a public 4G network may be deployed to provide public cellular phone services.

Using these different types of networks, application services such as Push-to-Talk (PTT) services and video streaming services, for instance, are accessible to users (also referred to herein as subscribers) of wireless communication devices like portable radios, cellular telephones, and Smartphones, to name a few. Sometimes users carry multiple such devices that can each be used to access the same application service but using different wireless networks. Users are also known to carry a single device that can be used to access the same application service using different wireless networks. In either case, the subscriber may at some point in time be located within a coverage area where multiple wireless networks are simultaneously available to her for accessing the same application service. In such a case, some methodology must be employed to select one of those networks for providing the application service.

A known method for selecting one of the networks is for a user to manually select the network. For example, if a user is carrying multiple communication devices such as a broadband PTT device and a LMR portable PTT device, the user might simply select a favored device, thereby selecting the network to which the favored device is connected. It is also known for a communication device, for example a radio that can access an application service over multiple networks, to implement an algorithm to automatically select one of the multiple networks. Such algorithms generally select the network based upon factors related only to the availability of the network. For example, the radio may automatically select: the network that is the first available network; the network with the best Received Signal Strength Indication (RSSI); or a preferred network as long as the network meets a minimum RSSI threshold. However, the user manually selecting the network and the algorithm used by the radio to automatically select the network oftentimes both fail to result in the best network selection for a particular application service.

For example, a selected network for PTT services may have a higher RSSI than the alternative available, but unselected, network. However, the selected network may be congested with subscribers using the PTT service, which results in a PTT request turn-around time of 3 seconds on that network. Whereas, the unselected network provides a more desirable PTT request turn-around time of 0.5 seconds. Therefore, in this case, the best network for the user to access the PTT service was not selected.

Accordingly, there is a need for a method and apparatus for selecting one of a plurality of networks for an application service based upon performance metrics for the application service.

BRIEF DESCRIPTION OF THE FIGURES

The accompanying figures, where like reference numerals refer to identical or functionally similar elements throughout the separate views, together with the detailed description below, are incorporated and form part of the specification and serve to further illustrate various embodiments of concepts that include the claimed invention, and to explain various principles and advantages of those embodiments.

Figure 1:
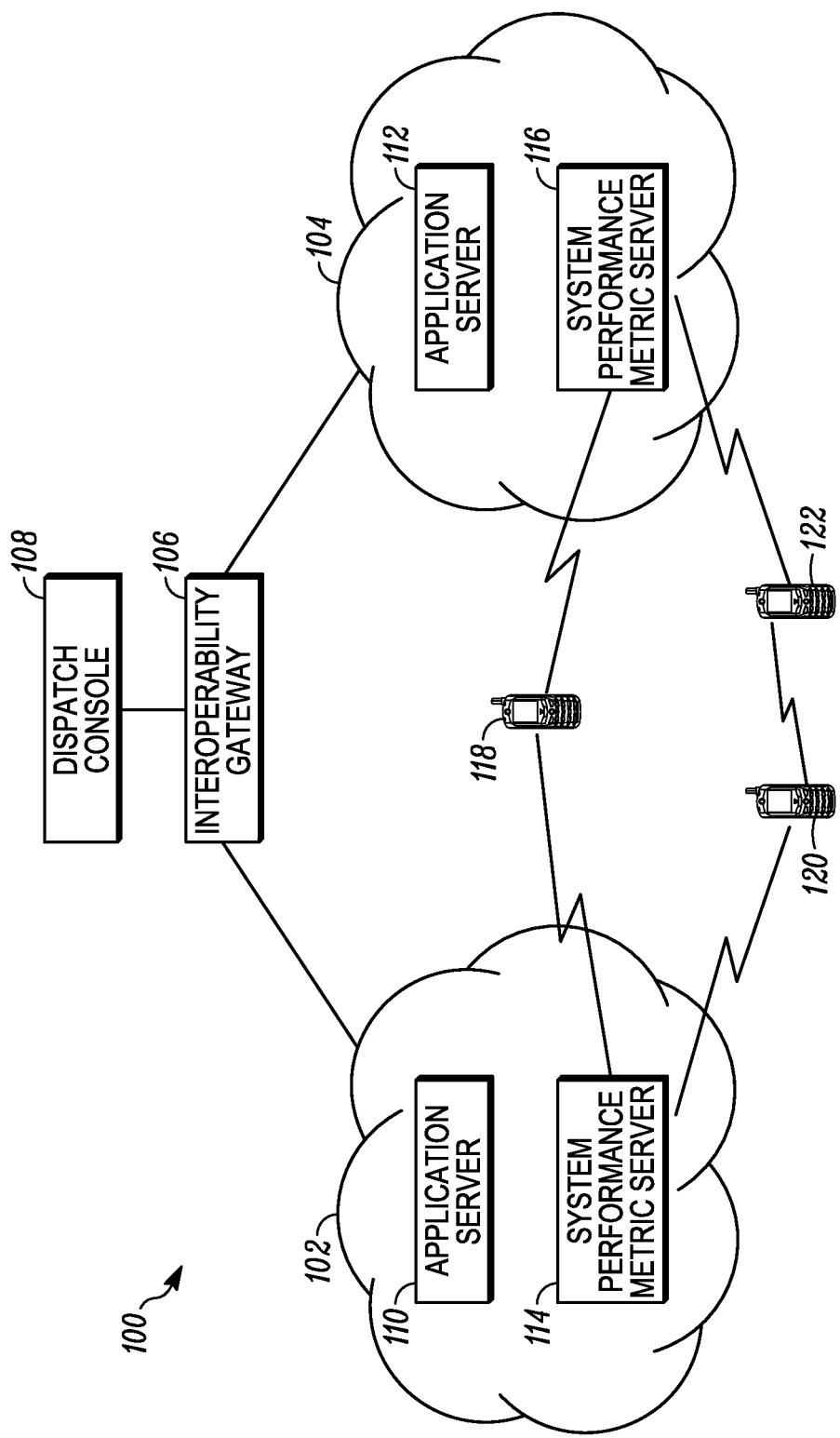
FIG. 1 illustrates a communication system implementing embodiments of the present teachings.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required.

Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Generally speaking, pursuant to the various embodiments, the present disclosure provides a method and apparatus for selecting a network for an application service based upon performance metrics for the application service. In accordance with the present teachings, a method performed by a communication device includes obtaining multiple sets of performance metrics, wherein each set of performance metrics comprises at least one performance metric for a same application service. As used herein, a set means one or more. The method further includes evaluating the multiple sets of performance metrics to select one of the corresponding networks to access the application service on the selected network.

Further in accordance with the present teachings, a method performed by a performance metric server (also referred to herein as system performance metric server) on a first Radio Access Network (RAN) includes receiving a set of Push-to-Talk (PTT) performance metrics from a PTT server on the first Radio Access Network. The PTT server provides a PTT service for subscribers. The method further includes generating a set of performance metrics that includes the set of PTT performance metrics, and sending the set of performance metrics to a radio for use in selecting between the first RAN and at least one other RAN for accessing the PTT service.

Further in accordance with the present teachings is a non-transient computer-readable storage element which stores computer readable code. The stored computer-readable code programs a computer to perform a method for selecting a network for an application service. The method includes obtaining multiple sets of performance metrics, wherein each set of performance metrics comprises at least one performance metric for a same application service, wherein the at least one performance metric for the application service is received from a system performance metric server on a corresponding network or determined by at least one of the first communication device or a second communication device coupled to the first communication device. The method further includes evaluating the multiple sets of performance metrics to select one of the corresponding networks to access the application service on the selected network.

Referring now to the drawings, and in particular FIG. 1, an illustrative communication system implementing embodiments in accordance with the present teachings is shown and indicated generally at 100. System 100 comprises two wireless networks (systems) 102 and 104, an interoperability gateway 106, a dispatch console 108, two application servers 110 and 112, two system performance metric servers 114 and 116, and three wireless communication devices 118, 120, and 122. Only a limited number of system elements 102 to 122 are shown for ease of illustration; but additional such elements may be included in the communication system 100. Moreover, other components needed for a commercial embodiment of the system 100 are omitted from the drawing for clarity in describing the enclosed embodiments.

A wireless network is defined herein to include a number of infrastructure devices that are networked together and that implement an access technology or access protocol to facilitate wireless communication for communication devices operating on the network. The type of infrastructure devices depends on the particular access technology being used. For example, networks that implement an access technology in accordance with the 3$^{rd}$ Generation Partnership Project (3GPP) LTE Technical Specifications (TSs) include a core network (having infrastructure elements such as a Policy and Charging Rules Function, a Packet Data Network Gateway, a Mobility Management Entity, a Serving Gateway, etc.) and a Radio Access Network (RAN) (in this case an evolved Universal Terrestrial Radio Access Network (e-UTRAN)) having infrastructure elements of one or more eNodeBs, through which communication devices (e.g., 118, 120, and 122) attach (i.e., connect) to the wireless network using an over-the-air interface protocol. In another example, LMR networks are RANs that implement P25 standards and include infrastructure elements such as, but not limited to, an RF Sub-system, a Console Sub-system, a Key Management Facility, and one or more fixed stations that provide an air interface to the wireless communication devices. As defined herein, a RAN is a network that provides access to and manages radio frequency (RF) resources used to carry media and control signaling over-the-air.

The interoperability gateway 106 facilitates communications between the networks 102 and 104. An interoperability gateway generally functions to bridge communications between two different types of networks. For example, an interoperability gateway is used to provide interconnectivity between a narrowband wireless network (e.g., a LMR network) and a broadband wireless network (e.g., a LTE network) to allow group calls between communication devices operating on the two different networks. In communication system 100, the interoperability gateway 106 makes network elements (e.g., the application server 110) on the network 102 accessible to devices attached to the network 104, and vice versa. Additionally, the interoperability gateway 106 enables wireless communication devices and some infrastructure devices (e.g., the application servers 110 and 112) on the networks 102 and 104 to access other infrastructure devices (e.g., the dispatch console 108) connected to the interoperability gateway 106, but not connected to the networks 102 and 104. However, it should be noted that in an alternative implementation, one or more dispatch consoles are directly connected to either of the networks 102 or 104.

The dispatch console 108 runs an application, such as a Computer Aided Dispatch (CAD) application, that enables the console to generate groups (e.g., of emergency responders) to respond to incidents and may further coordinate operations and exchange data within the groups. In an embodiment, the dispatch console is used by a Public Safety dispatcher. For example, in response to a 911 call, the Public Safety dispatcher uses the console 108 to coordinate the dispatch of police and fire personnel and the formation of one or more talkgroups between these personnel to facilitate voice communications to respond to the 911 call. As used herein, a talkgroup is defined as a communication group established for exchanging at least voice media but may also be used to exchange other media such as video and data messaging.

The application servers 110 and 112 each host one or more applications to provide application services, such as PTT services (also referred to herein as PTT application services), video conferencing and real-time video streaming services, Voice over IP (VoIP) conferencing services, text messaging services, etc., for subscribers. Accordingly, as used herein, an application service means a service provided to a user or subscriber by way of an application residing on a server within a network. Multiple applications may be physically housed in a single application server or distributed across multiple application servers. A PTT service allows a group of people to converse in half-duplex communication mode. In other words, when one group member transmits (or talks), the other group members receive (or listen). Since the information exchanged within the group of people using the PTT service is primarily voice, this type of communication group is generally referred to as a PTT talkgroup. An application server that provides a PTT service is termed herein as a PTT server (or PTT application server).

The system performance metric servers 114 and 116 are each configured to perform methods in accordance with the present teachings to generate a set of performance metrics that the system performance metric server sends to wireless communication devices that operate on the wireless network that houses the server, such as methods illustrated and described below by reference to FIGS. 2-5. The application server and corresponding system metric server within a given networks are shown as separate physical entities. However, in an embodiment, the two servers may share the same physical platform. Accordingly, in another illustrative implementation (not shown) the application server (e.g., a PTT or other server), which also logically functions as the system performance metric server, generates (e.g., collects or otherwise determines) the set of performance metrics that is provided to the communication devices operating on a given network.

As used herein, a set of performance metrics is defined as one or more metrics that, at a minimum, includes a performance metric for an application service, which is provided by and collected from an application server (meaning a performance metric server) on a wireless network; wherein the set of performance metrics enables a communication device operating on the wireless network to select from a plurality of different networks to access the application service. Additionally, a communication device can independently determine performance metrics for the application service, such as a PTT request turn-around time, which the communication device evaluates instead of or in addition to the performance metrics received from the performance metric server to select the network for accessing the application service. In one embodiment, only the performance metrics received from the system performance metric server are evaluated to select the network for accessing the application service. Alternatively, both the performance metrics received from the system performance metric server and the performance metrics determined by the communication device are used to make the network selection. In yet another alternative embodiment, only the performance metrics determined by the communication device are evaluated to select the network for accessing the application service. Thus, "obtaining" performance metrics, as the term is used herein, includes a communication device self-determining the performance metric or receiving the performance metrics from a performance metric server or another communication device coupled thereto (i.e., a collaborative device).

A performance metric for an application service (also referred to herein as an application service metric) means a metric or measurement that quantifies performance of, availability of, or accessibility to, particularly, the application service or application server providing the application service. This is in contrast to a performance metric for a network or system (also referred to herein as a network metric) that quantifies performance of, availability of, or accessibility to, generally, the network over which the application service is delivered.

Thus, in the prior art, network selection to access a given application service was performed based only upon performance metrics for the networks, and was attendant with the problems discussed earlier. However, In accordance with the present teachings, network selection is performed (at least in part) based upon one or more performance metrics for the application service. Accordingly, it can be said that based on the present novel teachings, a communication device, in essence, using the sets of performance metrics received from the performance metric server and/or determined by the communication device for multiple networks each having an application server that provides the same application service, can optimally select a particular application server for providing the application service.

Depending on a particular implementation of the present teachings, network selection is based only upon performance metrics of the application service, for example collected in one or more parameters from the application servers that provide the application service and/or determined by the communication device. However, in other implementations, network selection is based upon both performance metrics for the application service and performance metrics for the network, for example collected from infrastructure devices (e.g., base stations) within the network or by monitoring network performance, availability, and accessibility based on certain parameters. Thus in additional to one or more performance metric for a given application service, the set of performance metrics provided to the communication devices by the system performance metric servers or determined by the communication devices, may further include one or more performance metrics for the networks.

The wireless communication devices 118, 120, and 122 (also generally referred to herein as radios) are configured to perform methods in accordance with the present teachings to select a network for an application service based upon system performance, such as methods illustrated and described below by reference to FIGS. 2-5. The radios 118, 120, and 122 are wireless communication devices that facilitate communication of media to and from the subscriber using the radio. The radios are also commonly referred to in the art as mobile devices, access devices, access terminals, mobile stations, mobile subscriber units, subscriber units, user devices, and the like, and can be any type of wireless communication device such as portable radios, mobile radios, mobile phones, mobile data terminals, Personal Digital Assistants (PDAs), laptops, two-way radios, cell phones, Smartphones, etc.

As shown in FIG. 1, the radio 118 is attached to multiple networks, e.g., both network 102 and network 104. Thus, the radio 118 is termed herein as a "converged radio" meaning that radio 118 encompasses, within its own physical housing, hardware and software used to implement different radio access technologies that provide the radio 118 seamless connectivity to different types of networks.

As further shown in FIG. 1, the radio 120 is attached to the network 102 while the radio 122 is attached to the network 104. Additionally, the radio 120 can access resources on the network 104 through a communicative coupling (e.g., an interface) with the radio 122. Likewise, the radio 122 can access resources on the network 102 through a communicative coupling with the radio 120. Accordingly, the radios 120 and 122 are termed herein as "collaborative radios" meaning that the radios 120 and 122 operate in tandem via an interface between the radios to connect to and operate on multiple wireless networks, wherein each collaborative radio (using its own internal hardware and software) is only capable of connecting to and operating on a subset (meaning less than all) of the multiple networks.

Notwithstanding (as shown by reference to FIG. 2 for instance) one or all of the collaborative radios can be a converged radio. Additionally, there may be more than two collaborative radios cooperatively operating to connect to and operate on multiple wireless networks. As used herein, elements or devices being "communicatively coupled" means that the devices are connected through an interface (either wired or wireless or both), wherein the interface enables messaging, signaling, data, media and the like to be transferred between the devices.

In general, as used herein, the radios 118-122, infrastructure devices (e.g., application servers 110 and 112, and system performance metric servers 114 and 116), the dispatch console 108, the interoperability gateway 106, and other infrastructure devices within the networks 102 and 104 (or their hardware) being "configured" or "adapted" means that such elements are implemented using one or more (although not shown) memory devices, network interfaces, and/or processing devices that are operatively coupled. These operatively coupled memory devices, network interfaces, and/or processing devices, when programmed, form the means for the corresponding system elements to implement their desired functionality, for example, as illustrated by reference to the methods shown in FIGS. 2-5.

The network interfaces (or simply interfaces) are used for passing signaling also referred to herein as messaging (e.g., messages, packets, datagrams, frames, superframes, and the like) containing control information, voice or non-voice media between the elements of the system 100. The implementation of the network interface in any particular element depends on the particular type of network, i.e., wired and/or wireless, to which the element is connected and depends on any other devices to which a particular elements directly connects to. For example, the radios contain wireless interfaces to wirelessly attach to the RAN, and there may be wired interfaces between the infrastructure devices, such as the application server 110 and the system performance metric server 114, contained in system 100.

Where the network and devices support wireless communications, the network interfaces comprise elements including processing, modulating, and transceiver elements that are operable in accordance with any one or more standard or proprietary wireless interfaces, wherein some of the functionality of the processing, modulating, and transceiver elements may be performed by means of the processing device through programmed logic such as software applications or firmware stored on the memory device of the system element or through hardware. Examples of wired interfaces include Ethernet, T1, USB interfaces, etc.

The processing devices utilized by the elements of system 100 may be partially implemented in hardware and, thereby, programmed with software or firmware logic or code for performing functionality described by reference to FIGS. 2-5; and/or the processing devices may be completely implemented in hardware, for example, as a state machine or ASIC (application specific integrated circuit). The memory implemented by these system elements can include short-term and/or long-term storage of various information needed for the functioning of the respective elements. The memory may further store software or firmware for programming the processing device with the logic or code needed to perform its functionality.

Figure 2:
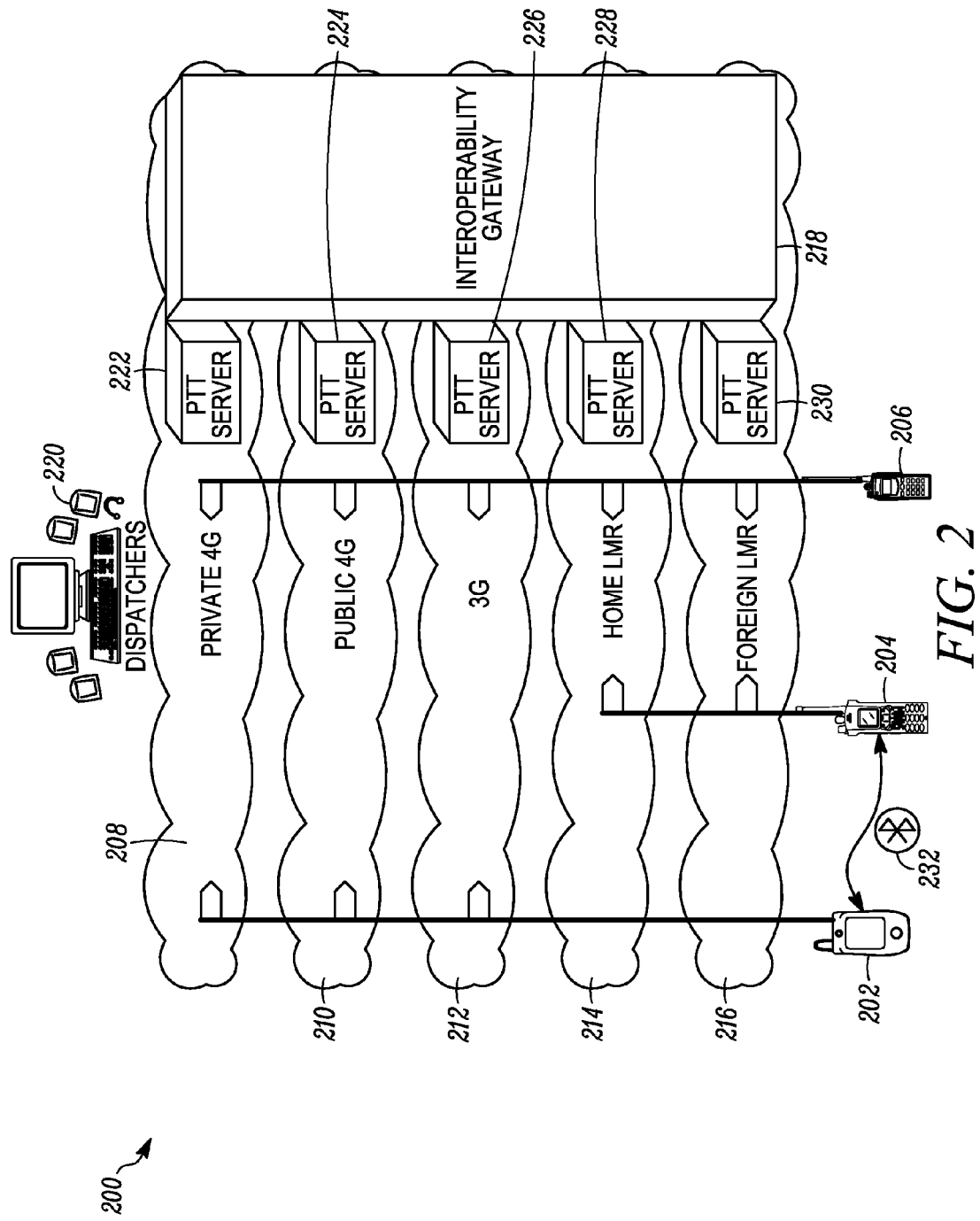
FIG. 2 illustrates a communication system implementing embodiments of the present teachings.

Referring now to FIG. 2, another illustrative communication system implementing embodiments in accordance with the present teachings is shown and indicated generally at 200. System 200 comprises three radios 202-206, five networks 208-216, an interoperability gateway 218, five PTT servers 222-230, and a set of dispatchers 220. The five networks 208-216 (i.e., a private 4G network 208, a public 4G network 210, a 3G network 212, a home LMR network 214, and a foreign LMR network 216) are interconnected through the interoperability gateway 218. The set of dispatchers 220 connect to one or more of the five networks 208-216 directly or via the interoperability gateway 218. The five PTT servers 222-230 are on the five networks 208-216 respectively, and each provides PTT services to authorized subscribers. Each of the five networks 208-216 comprises a RAN, through which the radios 202-206 access the corresponding network.

In this illustrative embodiment, the radio 206 is a converged radio, and is capable of accessing all five networks 208-216. In other words, the radio 206 is capable of connecting to and receiving performance metrics from each of the five networks 208-216 via a system performance metric server (not shown) within each network. The radio 206 is capable of accessing or using a PTT service provided by each of the PTT servers 222-230 on the five networks 208-216, respectively. Radio 204 is also a converged radio but is only capable of accessing and operating on a subset (i.e., networks 214 and 216) of networks 208-216. Similarly, radio 204 is a converged radio but is only capable of accessing and operating on a subset (i.e., networks 208-212) of networks 208-216.

In addition, the radios 202 and 204 are also collaborative radios. Accordingly, radio 202 serves as a gateway radio for the radio 204 to access the networks 208-212, and the radio 204 serves as a gateway radio for the radio 202 to access the networks 214 and 216. A gateway radio is defined as a radio that functions as a communication bridge between a radio and a network. Additionally, the radios 202 and 204 can act as a master radio to each other. A master radio is defined as a radio that receives system performance or other metrics from a second radio, and evaluates the received performance metrics to select a network for the second radio or the master radio to access for an application service. The master radio further sends an indication (e.g., a network identifier) of the selected network to the second radio. The collaborative radios 202 and 204 are communicatively coupled via an interface 232, which in this case is a wireless Bluetooth interface. However, in alternative embodiments, the interface is a different type of wireless interface or is a wired interface.

Figure 3:
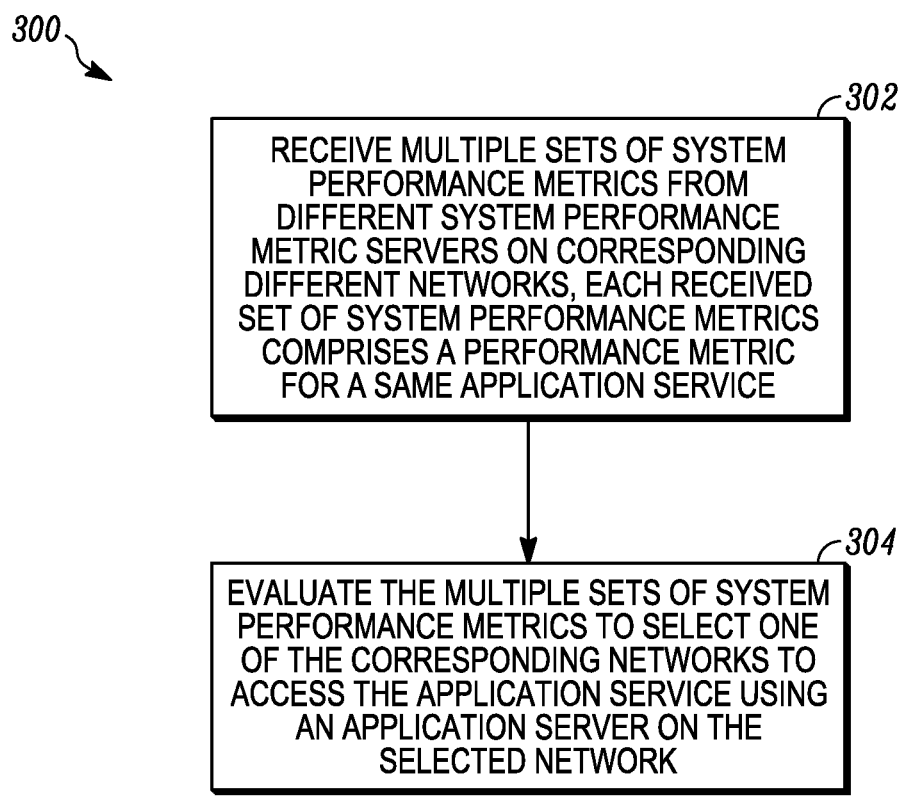
FIG. 3 is a logical flowchart illustrating a method for selecting a network for an application service based upon performance metrics for the application service, in accordance with some embodiments.

We now turn to a detailed description of the functionality of the system 100 elements in accordance with the teachings herein and by reference to the remaining figures. FIG. 3 illustrates a logical flow diagram showing a general method 300, performed by a radio (e.g., the radio 118, 120, or 122), for selecting a network for an application service (or in other words for selecting an application server) based upon application service metrics. In one illustrative implementation, method 300 is performed by a converged radio. In another example implementation, method 300 is performed by a master radio for multiple collaborative radios.

Accordingly, at 302, when a radio is within the coverage area of multiple different networks (e.g., the networks 102 and 104) to which it has access either by itself or through one or more other radios (in the case of collaborative radios), the radio receives multiple sets of performance metrics, wherein each set is received from different system performance metric servers (e.g., system performance metric server 114 or 116) on the corresponding different networks. In accordance with the teachings herein, the radio can access the same (a common) application service (e.g., a PTT service) using the application server (e.g., a PTT server) in any of the multiple networks; so each set of performance metric contains at least one performance metric for that common application service. Additionally, the radio may independently determine performance metrics for the application service (e.g., a PTT request turn-around time), in addition to or instead of the performance metrics received from the different system performance metric servers.

Examples of performance metrics for an application service include (individually or in any combination), but are not limited to, parameters such as those providing an indication of: current turn-around time for a service request sent to the application server providing the application service; loading of the application service (also interchangeably referred to herein as loading of the application that provides the application service); availability of the application service (also interchangeably referred to herein as availability of the application that provides the application service); the services supported by the application service (e.g., voice, video, web, etc.); or any other parameter that provides a quantitative measure (through some corresponding parameter value) of performance of, availability of, or accessibility to the application service or application providing the application service.

The application service metrics utilized depends on the particular application service that the radio will be accessing. As stated above, the performance metrics may also include one or more network metrics. Such metrics may include, but are not limited to, parameters that provide a measurement (through some corresponding parameter value) of latency, packet loss, retransmission, throughput, RF resource availability, etc. Performance metrics for a network are well known in the art and will not be discussed in further detail for the sake of brevity.

As defined herein, turn-around time for a service request provides a measure of time it takes to receive a response from the application server after sending the request. In an embodiment, turn-around time for a service request is determined by or based on the time it takes the network and application server to process the request and provide an appropriate response. Loading of the application can be measured by current capacity of the application server running the application and determined by or based on central processing unit utilization level, for instance. Alternatively, loading of the application is measured by current request load and maximum request capacity of the application. For example, where the current request load and maximum request capacity for a PTT service are ten (10) and eleven (11) service requests per second respectively, loading of the PTT service is 90%. Availability of the application is a measure of likelihood of the application being accessible or operational to provide the application service. An indication of whether an application server running an application is redundant or non-redundant and the availability of an interoperability link to the interoperability gateway are each example parameters that indicate a measure of availability of the application.

The radio can receive the performance metrics (or portions thereof) in response to sending performance metric queries to the system performance metric servers on the networks, receiving broadcast (one-to-many) messages from the networks containing the performance metrics, or a combination of the two methods. In one example implementation, the radio 118 sends a query to both system performance metric servers 114 and 116 and receives from each, in response thereto, a performance metric for a PTT service provided by PTT servers on the respective networks. In a further implementation, the radio 118 also receives periodic updates of network metrics in broadcast messages from one or both of the system performance metric servers 114 and 116. Additionally, the radio can receive a set of performance metrics, targeted to this radio, from a system performance metric server on a network. For example, where a network decides to reduce loading (such as number of subscribers) on the network, a set of performance metrics is sent to one or more radios to force the radios to select another network for accessing application services. In another example, where a network is being connected to by only two radios for accessing an application service and the network decides to force the connected radios to attach to another network, a set of performance metrics is sent to the two radios for this purpose.

When the radio is a converged radio, it receives the multiple sets of performance metrics directly from the system performance metric servers of the respective networks. For example, by reference to FIG. 2, when the radio 206 is within the coverage area of networks 208-216, it receives performance metrics from each of the corresponding system performance metric servers on the respective networks. However, when the radio is functioning as a master radio, it receives at least some or a portion of the multiple sets of performance metrics from the system performance metric servers via another radio. For example, when the radio 202 functions as a master radio, it receives, via the radio 204, performance metrics from the system performance metric servers on the networks 214 and 216.

At 304, the radio evaluates the multiple sets of performance metrics and/or metrics for the application service determined by the radio or another collaborative radio coupled to the radio to select one of the corresponding networks to access the common application service using the application server on the selected network. When there are multiple application servers to chose from, the radio performs an algorithm that considers the performance metrics for the application service and optionally performance metrics for the network to rank the networks (in essence the application servers), and thereby, choose the optimal network (application server) to access the desired application service. Alternatively, the subscriber manually selects the network, via a user interface, based upon the evaluation performed by the converged or master radio.

For example, the radio 118 evaluates two sets of performance metrics, with one set received from each of the system performance metric servers 114 and 116, and selects network 102 or 104 to access a PTT service provided by a PTT server (e.g., application server 110 or 112). Let us suppose that the (radio-determined) performance metrics for the application service indicates a PTT request turn-around time on network 102 of 2.6 seconds, and the (radio-determined) performance metrics for the application service indicates a PTT request turn-around time on network 104 of 0.6 seconds. In this example, the radio 118 selects network 104 to access the PTT service provided by server 112. In such a case, the radio 118 selects network 104 based on PTT request turn-around time, even if network 102 is preferred over network 104 based on network metrics such as RSSI.

Figure 4:
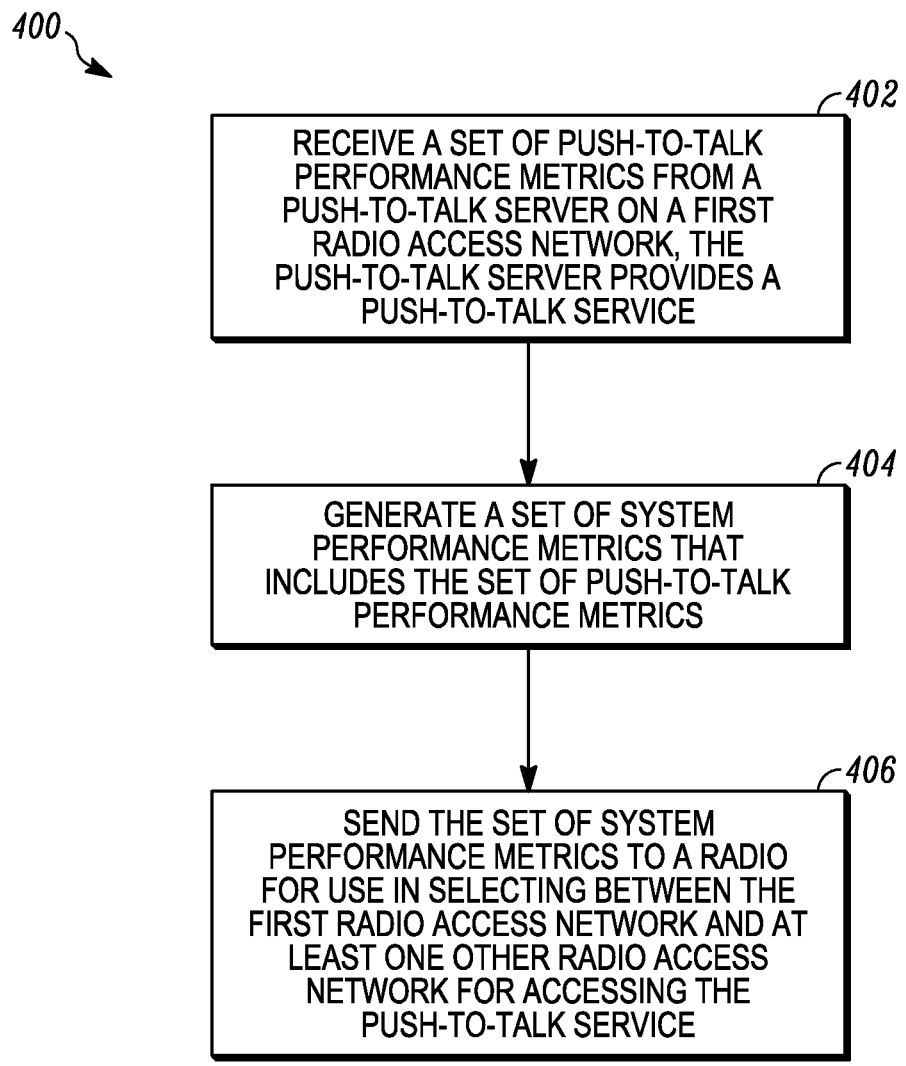
FIG. 4 is a logical flowchart illustrating a method for providing performance metrics to enable the selecting of a network for an application service based upon these system performances metrics, in accordance with some embodiments.

Referring now to FIG. 4, illustrated is a method 400, performed by a system performance metric server (e.g., system performance metric servers 114 and 116), for providing performance metrics. The performance metrics enable a radio to select a network (or an application server within the network) for accessing an application service based upon performance metrics for the application service, in accordance with some embodiments. In this illustrative implementation, the application service is a PTT service, and the corresponding application server providing the application service is a PTT server. However, the method 400 is applicable with any application service and corresponding application server.

The system performance metric server monitors infrastructure elements within its RAN to collect performance metrics. At a minimum, in this example, the system performance metric server is communicatively coupled to and communicates with at least one PTT server in the network to collect performance metrics for the PTT service from the PTT server. The performance metrics that the PTT server provides for the PTT application are also referred to herein as PTT performance metrics. Additionally, as described above, the system performance metric server may monitor other RAN network elements such as base stations and collect performance metrics for the network.

Examples of PTT performance metrics that the PTT server may provide include, but are not limited to, indications of any one or combination of the following parameters: PTT request turn-around time (also referred to herein and in the art as call turn-around time), PTT service availability, PTT service loading, types of application services (e.g., voice, video, and web) supported by PTT service, the PTT server's ability to reach talkgroup members (i.e., talkgroup member reachability by the PTT server), PTT server's ability to reach dispatch consoles (i.e., dispatcher reachability by the PTT server), number of talkgroup members present in the network served by the application server, and time to reach other members within a talkgroup on a network. The talkgroup member reachability and dispatcher reachability depend on the ability of the PPT server to access underlying network elements or infrastructure devices to provide PTT service to the radio. Furthermore, PTT performance metrics may be determined by a communication device. For example, based on turn-around time for a PTT service request, a communication device determines a PTT performance metric.

In one illustrative embodiment of the present teachings, the system performance metric server periodically queries the PTT server for PTT performance metrics. Alternatively, the system performance metric server registers itself to the PTT server as a recipient of PTT performance metrics. Thereafter, the PTT server either periodically (or when necessary, e.g., when the PTT performance metrics change) updates the system performance metric server with PTT performance metrics about PTT services provided by the PTT server.

At 404, the system performance metric server generates a set of performance metrics that includes the set of PTT performance metrics received from the PTT server. Additionally, the performance metrics may include other performance metrics, such as performance metrics for the network. At 406, the system performance metric server sends the set of performance metrics to a radio, which the radio uses to perform an analysis to select one of a plurality of RANs to access the PTT service. However, at 406, the radio may use this set of performance metrics together with an additional set of performance metrics for the application service (which is determined by the radio) to select one RAN to access the PTT service. Alternatively, at 406, the radio uses only the radio-determined set of performance metrics for the PTT service to select the RAN to access the PTT service.

Figure 5:
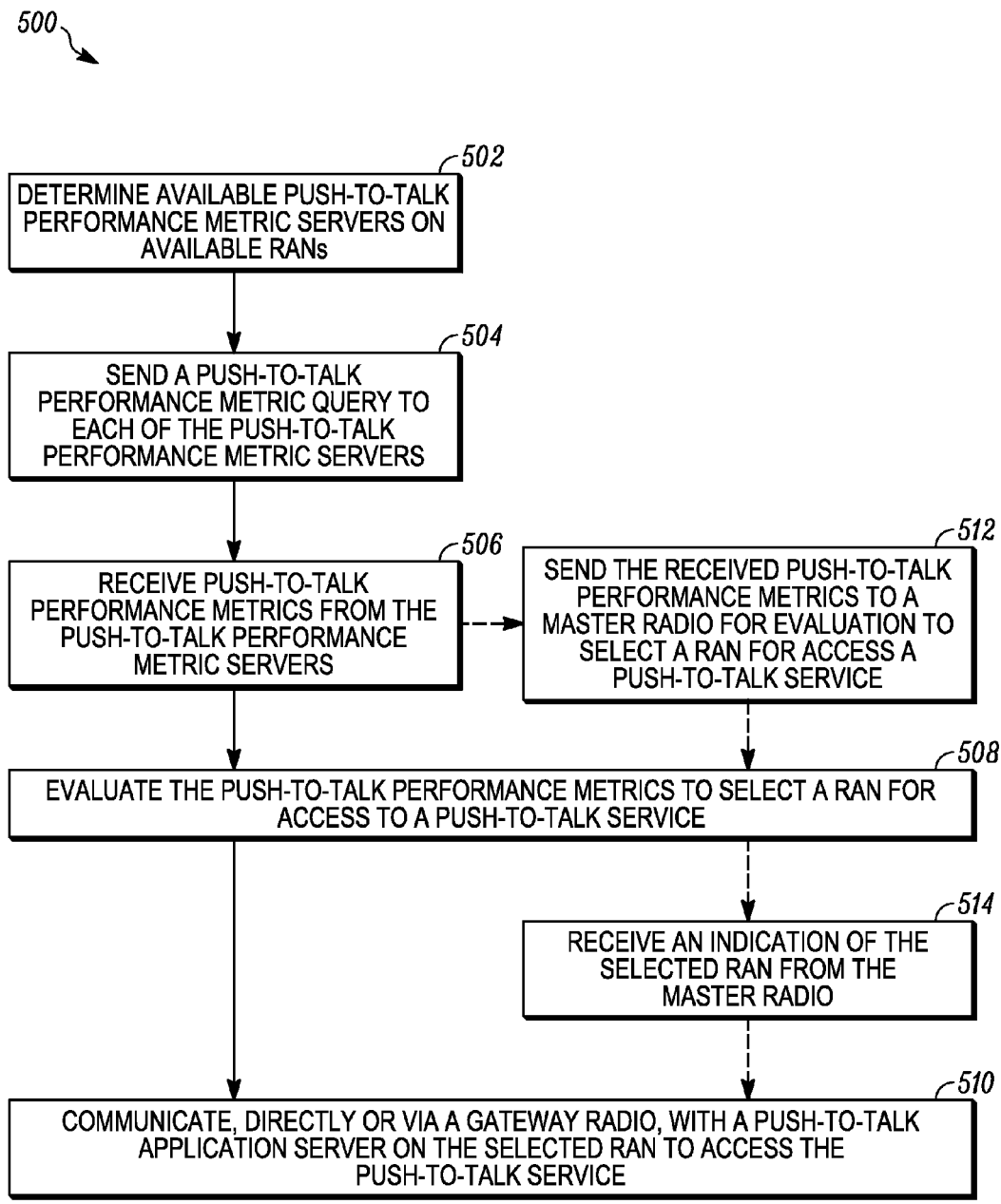
FIG. 5 is a logical flowchart illustrating a method for selecting a network for an application service based upon performance metrics for the application service, in accordance with some embodiments.

Referring now to FIG. 5, a logical flow diagram illustrating a method 500, performed by a radio (e.g., the radios 118-122), for selecting a network for an application service based upon performance metrics for the application service is shown. In this illustrative implementation, the application service is a PTT service, and the corresponding application server providing the application service is a PTT server. However, the method 500 is applicable with any application service and corresponding application server. The method can be performed by a converged radio, a master radio, or another radio that uses the master radio to evaluate performance metrics.

Turning now to method 500, at 502, the radio determines available system performance metric servers (e.g., servers 114-116) on available networks (e.g., networks 102-104) that include a RAN. In this illustrative embodiment, the radio determines available PTT system performance metric servers (i.e., system performance metric servers providing PTT performance metrics) on available RANs. A RAN is termed to be available to the radio when the radio is able to access and communicate with infrastructure devices (e.g., application servers) on the RAN. There are a variety of methods for the radio to determine available PTT performance metric servers on available RANs. For example, the radio sends a query conforming to a predetermined format or configuration to the available RANs to request for identity of available PTT performance metric servers. Alternatively, the available PTT performance metric servers periodically broadcast their identification.

At 504, the radio sends a performance metric query (i.e., PTT performance metric query in this illustrative embodiment) to each available PTT performance metric server. Responsive to the query, PTT performance metric servers send PTT performance metrics to the radio. At 506, the radio receives the PTT performance metrics sent from the PTT performance metric servers. Alternatively, PTT performance metric servers send the PTT performance metrics to the radio using one or more broadcast messages. Another alternative is that some of the PTT performance metrics are sent in response to one or more PTT performance metric queries, while other PTT performance metrics are sent using one or more broadcast messages. In the case of a master radio performing function 506, the master radio also receives performance metrics from other networks via one or more other radios. Yet another alternative is that the radio can receive a set of performance metrics, targeted to this radio, from a system performance metric server on a network.

When the radio (e.g., a converged radio or a master radio) does not depend on a master radio to evaluate the received PTT performance metrics, the radio, at 508, evaluates the received PTT performance metrics to select a RAN for accessing the PTT service. Additionally, at 508, the radio may evaluate the received PTT performance metrics and (radio-determined) PTT performance metrics together to select a RAN for accessing the PTT service. The radio can use any number of evaluation criteria to select a RAN at 508. For example, the radio, at 508, selects a RAN that provides the smallest PTT request turn-around time. Alternatively, the radio, at 508, selects a RAN that hosts the smallest number of talkgroup members. Moreover, the radio, at 508, may select a RAN based on more than one system performance parameter.

After selecting the network, the converged radio, at 510, communicates directly with the PTT server on the selected RAN to access the PTT service. The master radio communicates directly with the PTT server on the selected RAN to access the PTT service if the selected network is one of the master radio's networks. Otherwise, master radio communicates with the PTT server on the selected RAN to access a PTT service, via a gateway radio. The gateway radio bridges communications between the master radio and the selected network. The master radio provides to the gateway radio an indication of the selected RAN if the gateway radio is capable of operating over several RANs.

Turning back to 506, when the radio (e.g., a collaborative radio that does not function as a master radio) depends on a master radio to evaluate the received PTT performance metrics, the radio, at 512, sends the received (and radio-determined) PTT performance metrics to a master radio for evaluation. Responsive to the PTT performance metrics sent by the radio, the master radio, at 508, evaluates the received PTT performance metrics to select a RAN for the radios to access a PTT service on the selected RAN. The master radio further sends an indication (e.g., network identifier) of the selected network to the radio. At 514, the radio receives the indication of the selected network from the master radio. Responsive to the received indication of the selected network, the radio, at 510, communicates, directly or via a gateway radio, with the PTT server on the selected RAN to access the PTT service.

In accordance with the present teachings, a radio can also concurrently function as both a master radio and a gateway radio. For example, the radio 120 functions as both a master radio and a gateway radio for the radio 122 to access the network 102. While functioning as both a master radio and a gateway radio to the radio 122, the radio 120 can directly access application services (e.g., PTT services) provided by the application server 110.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and apparatus for selecting one of multiple networks for accessing an application service based upon performance metrics for the application service as described herein. The non-processor circuits may include, but are not limited to, a radio receiver, a radio transmitter, signal drivers, clock circuits, power source circuits, and user input devices. As such, these functions may be interpreted as steps of a method to perform the selecting one of multiple networks for accessing an application service based upon performance metrics for the application service described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a non-transient computer-readable storage element or medium having computer readable code stored thereon for programming a computer (e.g., comprising a processing device) to perform a method as described and claimed herein. Examples of such computer-readable storage elements include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method, performed by a first wireless communication device, for selecting a network from among a plurality of networks for an application service, the method comprising:
    sending a performance metric query to at least one of the system performance metric servers, wherein at least a portion of the corresponding set of performance metrics is received in response to the performance metric query;
    receiving, at the wireless communication device, multiple sets of performance metrics, wherein each set of performance metrics is associated with a network of the plurality of networks and comprises at least one performance metric for a same application service, wherein the multiple sets of performance metrics are received at the wireless communication device from a network server, and wherein the multiple sets of performance metrics are infrastructure-determined performance metrics; and
    evaluating the multiple sets of performance metrics by the wireless communication device to select a corresponding network of the plurality of networks to access the application service on the selected network;
    wherein the at least one metric for the same application service, within each set of performance metrics, is received from a corresponding system performance metric server on a corresponding network.

2. The method of claim 1, wherein the at least one metric for the same application service is determined by at least one of the first communication device or a second communication device coupled to the first communication device.

3. The method of claim 1, wherein at least a portion of one of the sets of performance metrics is received in a broadcast message from the corresponding system performance metric server.

4. The method of claim 1, wherein the application service is a Push-to-Talk service.

5. The method of claim 4, wherein the at least one performance metric for the application service comprises an indication of an ability to reach talkgroup members, by a Push-to-Talk server that provides the Push-to-Talk service.

6. The method of claim 4, wherein the at least one performance metric for the application service comprises an indication of dispatcher reachability by a Push-to-Talk server that provides the Push-to-Talk service.

7. The method of claim 1, wherein at least one of the sets of performance metrics is received via a second communication device communicatively coupled to the first communication device.

8. The method of claim 7 further comprising sending an indication of the selected network to the second communication device.

9. The method of claim 1 further comprising accessing the application service using an application server on the selected network.

10. The method of claim 9, wherein the application service is accessed on the selected network using a second communication device communicatively coupled to the first communication device.

11. The method of claim 1, wherein the at least one performance metric for the application service comprises an indication of turn-around time of a service request for the application service.

12. The method of claim 1, wherein the at least one performance metric for the application service comprises an indication of loading or an indication of availability of an application that provides the application service.

13. The method of claim 1, wherein the at least one performance metric for the application service comprises an indication of services supported by the application service.

14. A method, performed by a system performance metric server on a first Radio Access Network, for selecting a network for a Push-to-Talk service, the method comprising:
sending a Push-to-talk performance metric query to at least one of the system performance metric servers, wherein at least a portion of the corresponding set of Push-to-talk performance metrics is received in response to the performance metric query;
receiving at the server, a set of Push-to-Talk performance metrics on the first Radio Access Network, which provides a Push-to-Talk service;
generating, by the server a set of performance metrics that includes the set of Push-to-Talk performance metrics; and
sending, by the server, the set of performance metrics to a radio for use in selecting between the first Radio Access Network and at least one other Radio Access Network for accessing the Push-to-Talk service.

15. The method of claim 14, wherein the set of Push-to-Talk performance metrics comprises an indication of at least one of: talkgroup member reachability by the Push-to-Talk server; dispatcher reachability by the Push-to-Talk server; request turn-around time for the Push-to-Talk service; loading of the Push-to-Talk service; availability of the Push-to-Talk service; or services supported by the Push-to-Talk service.

16. A wireless communication device capable of selecting a network from among a plurality of networks for an application service, the wireless communication device comprising:
sending a performance metric query to at least one of the system performance metric servers, wherein at least a portion of the corresponding set of performance metrics is received in response to the performance metric query;
a processor configured to:
receive multiple sets of performance metrics, wherein each set of performance metrics is associated with a network of the plurality of networks and comprises at least one performance metric for a same application service, wherein the multiple sets of performance metrics were received at the wireless communication device from a network server, and wherein the multiple sets of performance metrics are infrastructure-determined performance metrics; and
evaluate the multiple sets of performance metrics to select a corresponding network of the plurality of networks to access the application service on the selected network;
wherein the at least one metric for the same application service, within each set of performance metrics, is received from a corresponding system performance metric server on a corresponding network.

* * * * *